(12) United States Patent
Chubbuck et al.

(10) Patent No.: US 8,454,044 B2
(45) Date of Patent: Jun. 4, 2013

(54) BICYCLE DAMPING SYSTEM

(75) Inventors: Kyle L. Chubbuck, San Jose, CA (US);
Christopher P. D'Aluisio, Corralitos, CA (US)

(73) Assignee: Specialized Bicycle Components, Inc., Morgan Hill, CA (US)

( * ) Notice: Subject to any disclaimer, the term of this patent is extended or adjusted under 35 U.S.C. 154(b) by 108 days.

(21) Appl. No.: 13/017,897

(22) Filed: Jan. 31, 2011

(65) Prior Publication Data

US 2011/0248469 A1    Oct. 13, 2011

Related U.S. Application Data

(60) Provisional application No. 61/321,790, filed on Apr. 7, 2010.

(51) Int. Cl.
*B62K 21/02* (2006.01)
*B62K 19/00* (2006.01)

(52) U.S. Cl.
USPC ............................ 280/276; 280/275; 280/283

(58) Field of Classification Search
USPC   280/275, 276, 283, 288.3; 267/136; 188/378, 188/379
See application file for complete search history.

(56) References Cited

U.S. PATENT DOCUMENTS

| | | |
|---|---|---|
| 1,559,277 A | 10/1925 | Nelson |
| 2,236,127 A | 3/1941 | Alexander |
| 2,307,279 A | 1/1943 | Kranz |
| 3,936,076 A | 2/1976 | Probst |
| 4,008,903 A | 2/1977 | Ramond |
| 5,039,470 A | 8/1991 | Bezin et al. |
| 5,318,819 A | 6/1994 | Pai |
| 5,367,918 A | 11/1994 | Chang et al. |
| 5,445,366 A | 8/1995 | Shih et al. |
| 5,460,357 A * | 10/1995 | Stewart .......................... 267/294 |

(Continued)

FOREIGN PATENT DOCUMENTS

| | | |
|---|---|---|
| CN | 2485215 | 4/2002 |
| CN | 201792923 | 4/2011 |

(Continued)

OTHER PUBLICATIONS

Martec Brochure (Martec Industrial Corporation); Composite Bicycle Series, Jan. 14, 2003.

(Continued)

*Primary Examiner* — Paul N Dickson
*Assistant Examiner* — Maurice Williams
(74) *Attorney, Agent, or Firm* — Knobbe Martens Olson & Bear LLP

(57) ABSTRACT

A bicycle damping system is arranged to reduce vibrations that originate at the bicycle wheel and are transmitted to the rider of the bicycle. Desirably, a front fork assembly is configured to be supported by a bicycle frame and includes a pair of fork legs, which extend in a downward direction along opposing sides of a front wheel of the bicycle. Preferably, the fork legs are configured to support the front wheel at their lower ends. Each of the fork legs can define a cavity and a damping member is positioned within the cavity. The damping member can be forced into contact with a surface of the fork leg. Seat stays, chain stays, the seat post and other components of the bicycle can also include a damping system.

12 Claims, 9 Drawing Sheets

U.S. PATENT DOCUMENTS

| | | | |
|---|---|---|---|
| 5,511,811 A | 4/1996 | Pileggi | |
| 5,597,169 A | 1/1997 | Bradbury | |
| 5,833,259 A | 11/1998 | Stewart | |
| 6,109,637 A | 8/2000 | Kirk | |
| 6,257,220 B1 | 7/2001 | McPherson et al. | |
| 6,267,399 B1 | 7/2001 | Buckmiller et al. | |
| 6,382,201 B1 | 5/2002 | McPherson et al. | |
| 6,431,574 B1 | 8/2002 | Gueugneaud | |
| 6,669,218 B1 | 12/2003 | Sinyard et al. | |
| 6,986,521 B1 | 1/2006 | Li et al. | |
| 7,017,930 B2 | 3/2006 | Callahan et al. | |
| 7,144,028 B2 | 12/2006 | Sinyard et al. | |
| 7,168,726 B2 | 1/2007 | Klein | |
| 7,175,191 B2 | 2/2007 | Sinyard et al. | |
| 7,380,808 B2 | 6/2008 | D'Aluisio et al. | |
| 7,398,986 B2 | 7/2008 | Sinyard et al. | |
| 2005/0279598 A1* | 12/2005 | McPherson | 188/378 |
| 2012/0013100 A1* | 1/2012 | Guillemette | 280/283 |

FOREIGN PATENT DOCUMENTS

| | | |
|---|---|---|
| DE | 20106106 | 6/2001 |
| EP | 0590239 | 4/1999 |
| FR | 2774060 | 7/1999 |
| FR | 2810291 | 12/2001 |
| JP | 8053092 | 2/1996 |
| JP | 08113178 | 5/1996 |
| WO | WO 01/96173 | 12/2001 |

OTHER PUBLICATIONS

International Search Report for International Application No. PCT/US2003/19215 mailed Oct. 1, 2003.

Extended European Search Report for European Application No. 07013594.2 dated Aug. 3, 2010.

* cited by examiner

BICYCLE DAMPING SYSTEM

RELATED APPLICATIONS

This application claims the benefit under 35 U.S.C. §119 (e) of U.S. Provisional Application No. 61/321,790 filed Apr. 7, 2010, titled BICYCLE DAMPING SYSTEM, the entire contents of which is hereby incorporated by reference herein and made a part of this specification.

BACKGROUND OF THE INVENTION

1. Field of the Invention

The present invention generally relates to bicycles. More particularly, the present invention relates to a system configured to reduce vibrations transmitted to a rider of the bicycle.

2. Description of the Related Art

Bicycle riding and racing often take place on less than ideal terrain conditions. For example, bicycle touring and racing may often take place on country roads, which may be unpaved or where the pavement may be rough and irregular, even when new. In more populated areas, a significant portion of paved roads may be damaged and in need of repair. When traversed by the bicycle, these irregular surfaces transmit vibrations to the bicycle. Furthermore, the surface of even relatively new pavement, while acceptable for motor vehicles, may be rough enough to transmit significant vibration to a bicycle. Accordingly, most bicyclists spend at least a significant portion of their riding time traversing rough or irregular surfaces. Vibrations induced by such terrain, if not sufficiently dampened, may be transmitted to the rider of the bicycle. When transmitted to the rider, these vibrations often cause discomfort and fatigue.

Several methods for damping terrain-induced vibrations have been utilized. For example, the bicycle may be equipped with front and/or rear suspension assemblies, which permit the suspended wheel to move against a biasing force relative to the bicycle frame. Although highly favored in some applications, such as bicycles intended primarily for off-road use, such suspension assemblies have generally been unsuccessful in connection with bicycles primarily intended for use on paved surfaces (i.e., road bicycles), where low weight and aerodynamics are considered highly important. Furthermore, such suspension assemblies are intended to absorb large bumps and may not be effective at isolating vibrations due to inherent friction within the assembly, which may prevent movement of the suspension assembly in response to small forces.

In road bicycle applications, it has recently become popular to utilize materials having improved damping properties in comparison to metals to form a portion or all of the bicycle between the wheels and the rider. For example, a composite material of carbon fiber fabric within a resin matrix ("carbon fiber") is often used in an attempt to isolate road-induced vibrations from the rider of the bicycle. In some instances, the entire frame of the bicycle may be comprised of a carbon fiber material.

Such an arrangement has been more successful in isolating terrain-induced vibrations from reaching the rider of the bicycle in comparison with bicycle frames and components comprised entirely of metal. However, although carbon fiber is lightweight and exhibits improved vibration damping characteristics in comparison to metal, a significant amount of vibration may nonetheless be transferred through components made from carbon fiber.

One proposed solution to carbon fibers undesirable transmission of vibrations is to incorporate an additional material into the carbon fiber fabric that is used to make the final carbon fiber product. For example, a weave of titanium filaments has been incorporated into carbon fiber fabric in an attempt to reduce the amount of vibration that is transmitted through components made of carbon fiber. However, such a solution necessitates a complex manufacturing process and, thus, increases the cost of the final product.

SUMMARY OF THE INVENTION

Accordingly, a need exists for a cost-effective method of reducing vibrations from being transmitted from the wheels of a bicycle to the rider of the bicycle. Preferred embodiments of a front fork assembly are constructed from a carbon fiber material and include a portion on each leg of the fork assembly, which defines a surface cavity for receiving a separate vibration damping member. Preferably, the vibration damping member is constructed from an elastomeric material and is retained with a plate and fastener within the surface cavity of each leg of the front fork.

One embodiment is a bicycle front fork assembly including a steer tube and a pair of fork legs extending in a downward direction from the steer tube and spaced from one another in a lateral direction. Each of the pair of legs has an upper portion, an intermediate portion and a lower portion and defines a substantially fixed length. The fork assembly is configured to support a wheel at the lower portions of the pair of legs and the pair of legs are interconnected at the upper portion. Each of the intermediate portions has a wall defining a surface cavity. A damping member is positioned within the surface cavity and a plate forces the damping member to contact the wall. The damping member comprises a vibration damping material.

Another embodiment can include a bicycle having a main frame portion, a wheel, and a substantially rigid wheel support. The wheel support can be coupled to the main frame portion at a first end and supporting said wheel at a second end, an outer wall of said wheel support defining a first surface cavity. The bicycle can also include a damping member positioned within said first surface cavity, a fastener and a plate. The plate can force the damping member into contact with a surface of the first surface cavity to dampen vibrations introduced to said wheel support by said wheel. The wheel support can be a front fork or a rear frame portion.

The bicycle can further include a second surface cavity and a second damping member positioned within said second surface cavity. The first and second surface cavities can be on opposing sides of the outer wall of the wheel support or on opposing sides of part of the wheel support such as opposing sides of a seat stay or fork leg. The plate can be connected to the fastener such that the first damping member is sandwiched between the plate and the fork leg and the second damping member is sandwiched between a head of the fastener and the fork leg.

Another embodiment involves a method of manufacturing a wheel support for a bicycle. The method includes constructing a body including a pair of legs interconnected at a first end and configured to support a bicycle wheel at a second end. Each of the pair of legs define a substantially fixed length between the first end and the second end. An intermediate portion extends between the first and second end and includes an outer wall portion which defines a cavity. The method also includes inserting a damping member into the cavity, the damping member comprising a vibration damping material. The method can also include attaching a plate to the intermediate portion to force the damping member into contact with the cavity.

Another embodiment is a bicycle including a main frame portion, a wheel, and a substantially rigid wheel support. The wheel support is coupled to the main frame portion at a first end and supports the wheel at a second end. An outer wall of the wheel support defines a cavity. A damping member is positioned within the cavity and dampens vibrations introduced to the wheel support by the wheel.

In some embodiments, one or more of a fastener and/or a plate can be used to force the damping member into contact a surface of the cavity to dampen vibrations introduced to the wheel support by the wheel.

BRIEF DESCRIPTION OF THE DRAWINGS

These and other features, aspects and advantages of the present invention are described with reference to drawings of a preferred embodiment, which is intended to illustrate, and not to limit, the present invention.

DETAILED DESCRIPTION OF THE PREFERRED EMBODIMENTS

Figure 1:
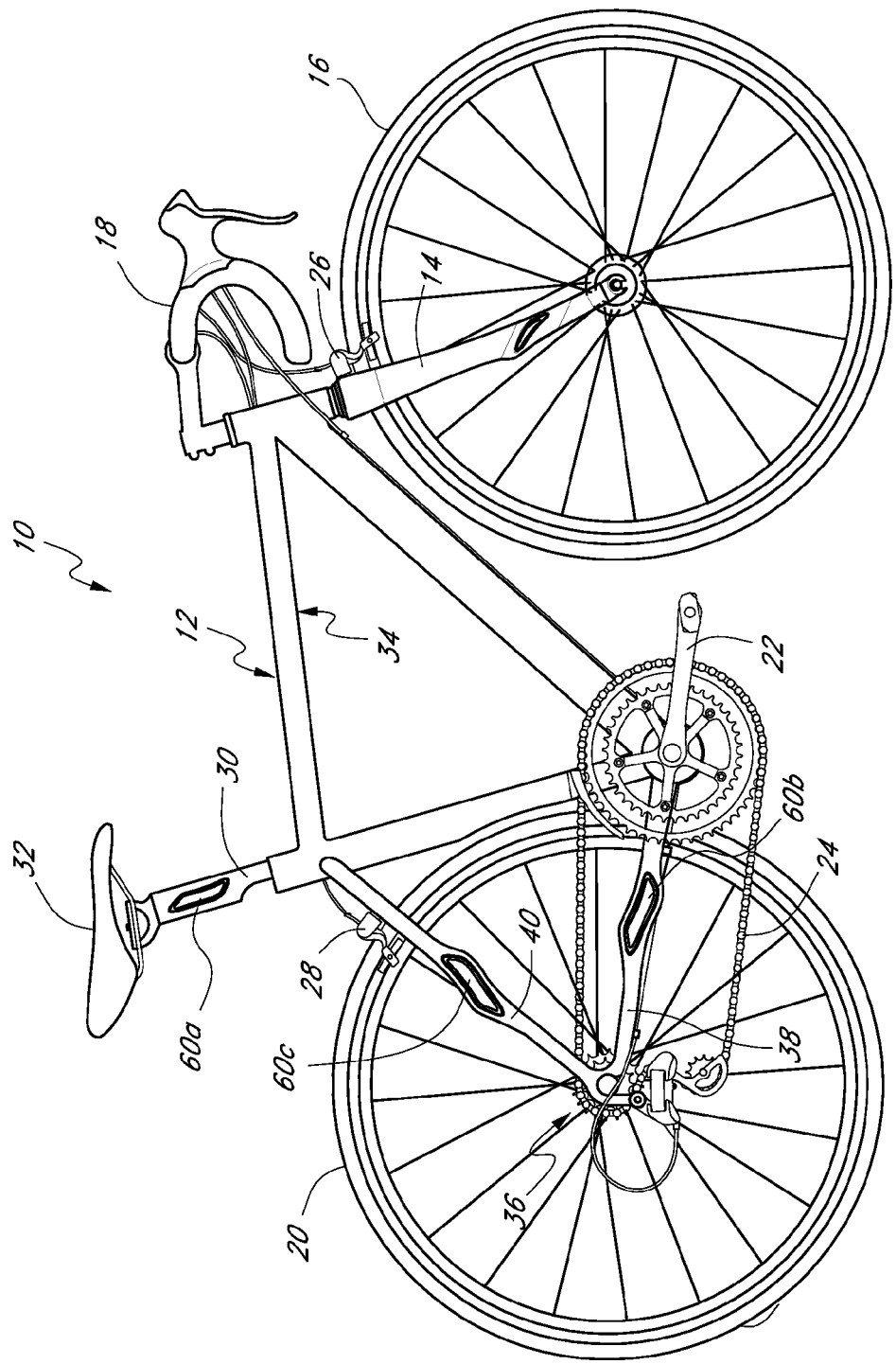
FIG. 1 is a side elevation view of a bicycle.

FIG. 1 illustrates a bicycle, which is referred to generally by the reference numeral 10. The bicycle 10 includes a frame 12, which rotatably supports a wheel support, or front fork assembly 14, near a forward end of the frame 12 for rotation about a steering axis. A lower end of the fork assembly 14 supports a front wheel 16 of the bicycle 10. A handlebar assembly 18 is connected to an upper end of the fork 14 for rotating the fork assembly 14 and front wheel 16 about the steering axis of the bicycle 10. In addition, the handlebar assembly 18 may include one or more rider controls, such as shifting or braking controls.

A rear wheel 20 of the bicycle 10 is supported near a rearward end of the frame 12. A pedal crank assembly 22 is rotatably supported by a lower portion of the frame 12. A drive chain 24 extends between the pedal crank assembly and the rear wheel to transfer power therebetween, as is well known in the art.

A front brake caliper 26 can be supported by the front fork assembly 14 and is configured to selectively apply a squeezing force to a rim of the front wheel 16. Similarly, a rear brake caliper 28 can be supported by the frame 12 and configured to selectively apply a squeezing force to a rim portion of the rear wheel 20. Alternatively, other types of braking systems may also be used.

A seat post 30 extends in an upward direction from the frame 12 and supports a seat 32 on its upper end. The seat post 30 may be adjusted in height relative to the frame 12 to adjust a seat height of the bicycle 10.

Preferably, the frame 12 includes a main frame portion 34 and a wheel support, or rear frame portion 36. The rear frame portion 36 desirably includes a pair of lower legs, or chain stay members 38 (only one shown), extending on each side of the rear wheel 20 from a lower portion of the main frame 34. In addition, the rear frame portion 36 includes a pair of upper legs, or seat stay members 40, extending from an upper portion of the main frame 34 on each side of the rear wheel 20 and being connected to a rear end of the chain stays 38 near a hub axis of the rear wheel 20.

At least the main frame 34 can be constructed from a plurality of tubular, metal pieces welded together. For example, the main frame 34 may be constructed from aluminum, steel or titanium tubing. Alternatively, the frame may comprise a composite material and may be constructed as a unitary piece or multiple pieces bonded or molded together. In addition, other suitable materials and/or construction methods may also be used, as will be appreciated by one of skill in the art.

As described above, the front fork assembly 14 preferably is constructed to reduce the amount of vibration passed from the front wheel 16 to the handlebar assembly 18, and thus the rider of the bicycle 10. Additionally, other components of the bicycle 10 may also be constructed to reduce vibration transfer. For example, the seat post 30 may be constructed to include a damping system 60a (FIG. 1), to reduce the transmission of vibrations from the frame 12 to the seat 32 and, thus, the rider of the bicycle 10. Furthermore, other components and/or portions of the bicycle 10, such as the chain stays 38 or seat stays 40 of the frame 12, may be similarly arranged to include a damping system 60b, 60c, respectively, to reduce the transmission of vibrations from the wheels 16, 20 to the rider of the bicycle 10, as will be appreciated by one of skill in the art in light of the teachings of the present application.

Figure 2:
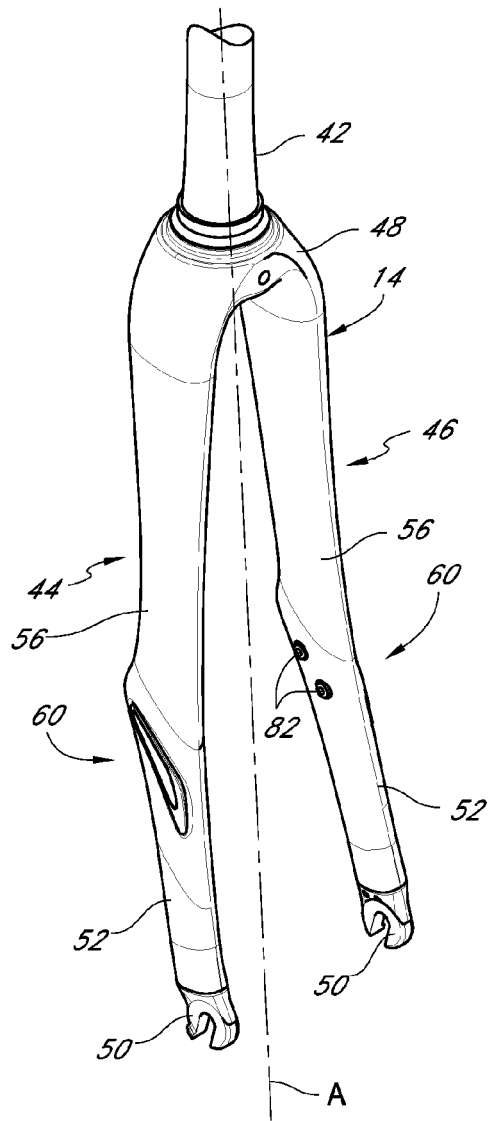
FIG. 2 is a perspective view of the front fork assembly of FIG. 1.
Figure 3:
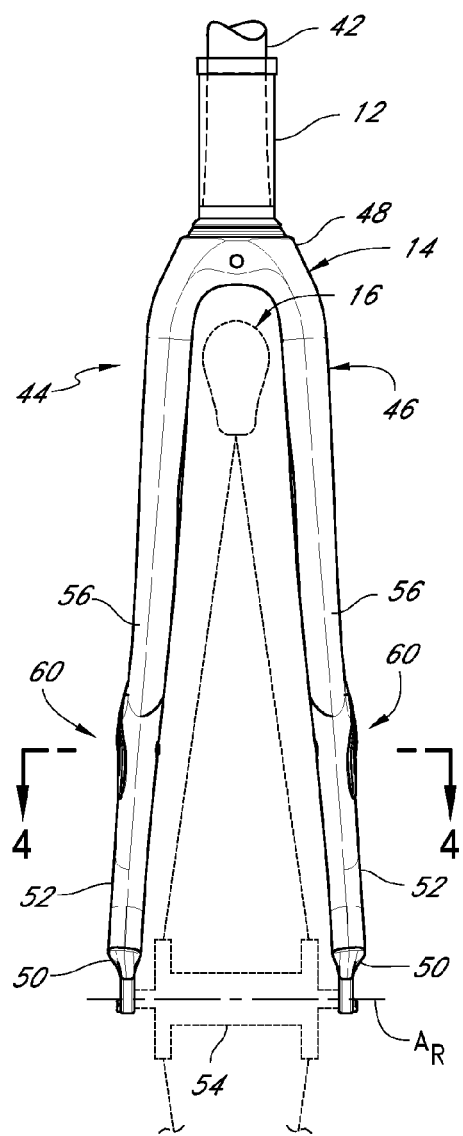
FIG. 3 is a front view of a portion of the bicycle and front fork assembly of FIG. 1.

With reference to FIGS. 2 and 3, one embodiment of a front fork 14 is illustrated in greater detail. In FIG. 2, the front wheel 16 has been omitted and in FIG. 3, the front wheel 16 is shown in phantom for the purpose of clarity. As is described in greater detail below, preferably, the fork 14 can be constructed as a composite of a plurality of sheets of a carbon fiber material within an epoxy resin matrix and incorporates a vibration damping system 60 that can include an elastomeric material. Preferably the elastomeric material comprises a thermoplastic elastomer, and more preferably a viscoelastomeric material, as is described in greater detail below.

A steer tube 42 of the front fork assembly 14 extends through the frame 12 of the bicycle 10 and supports the handlebar assembly 18 (FIG. 1) at its upper end. A pair of fork legs 44, 46 extend downward from the steer tube 42 on opposing sides of the front wheel 16. The fork legs 44, 46 are interconnected at an upper end 48, which is also connected to the steer tube 42. An intermediate portion 56 of the fork legs 44, 46 connects the upper portion 48 to the lower portion 52. Thus, each fork leg 44, 46 is a generally rigid member that defines a substantially constant length. That is, preferably, the fork assembly 14 is constructed such that relative movement between the front wheel 16 and the bicycle frame 12 along the axis of the fork leg is substantially prevented. Such a construction is commonly referred to as an unsuspended, or rigid, fork assembly. Furthermore, desirably, the fork legs 44, 46 and the steer tube 42 are of a one-piece construction.

A drop out 50 is secured to or integrally formed with a lower end 52 of each fork leg 44, 46. The drop outs 50 are sized and shaped to receive an axle portion of a hub 54 of the front wheel 16. In one arrangement, the drop outs 50 are constructed of a metal, such as aluminum or steel, and are secured to the fork legs 44, 46 by a bonding process. In another arrangement, the dropouts 50 are integrally formed with the fork legs 44, 46 of a carbon fiber material. However, other suitable arrangements to connect the front wheel 16 to the fork assembly 14 may also be used.

With reference to FIGS. 1 and 2, desirably, the fork legs 44, 46 are arranged such that the hub 54 is supported on a forward side of an axis A defined by the steer tube 42. This is commonly referred to as the "rake" or offset of the fork 14. Such an arrangement adjusts the stability of the handling characteristics of the bicycle 10, as is well known in the art.

As mentioned previously, a damping system 60 can be used to reduce and isolate terrain-induced vibrations from reaching the rider of the bicycle. A damping system 60 can be used on at least one of each fork leg 44, 46, the seat post 30, each seat stay 40 and each chain stay 38. As will be shown, the damping system 60 can be configured to force a damping member into contact with a component of the bicycle, for example, a fork leg. In addition, as also will be shown, the damping system 60 can be configured to sandwich a damping member between a component of the bicycle, for example, a fork leg, and a second member such as a fastener or plate. The damping member can contact a surface cavity in the component. In some embodiments, a damping member can be forced into contact with the component, such as with a fastener that secures the damping member to the component. In some embodiments, a damping member can be sandwiched between a plate and a component and can be forced into contact with the component with a fastener that secures the plate to the component or that further sandwiches the component between the plate and fastener. The fastener can be threaded, snap fit, or other type of fastener and can also include one or more fasteners. In some embodiments, the fastener or part of the fastener can be made integrally with the damping member. In some embodiments, a fastener can be attached directly to the damping member. The plate can be a rigid plate. The plate can contact substantially all, a majority of, or some of a surface of the damping member that is not contacting the component. Other embodiments and configurations can also be used, a few examples of which follow below.

A surface cavity can be a depressed portion in the component, such as a depression in a fork leg. The depressed portion can be depressed relative to a surrounding surface. The depressed portion does not pass all the way through the component and can have a back wall and side walls. In other embodiments, the depressed portion can be rounded or pointed so that the transition between the side walls and back wall may not be clearly defined. In addition, the side walls may also form the back wall, such as when the side walls form a "V" within the depression. The depressed portion can be any number of shapes and can be configured to maximize contact with the damping member. The depressed portion can be formed in many ways, such as being integrally formed with the component or material may be removed to form the depressed portion.

Figure 4:
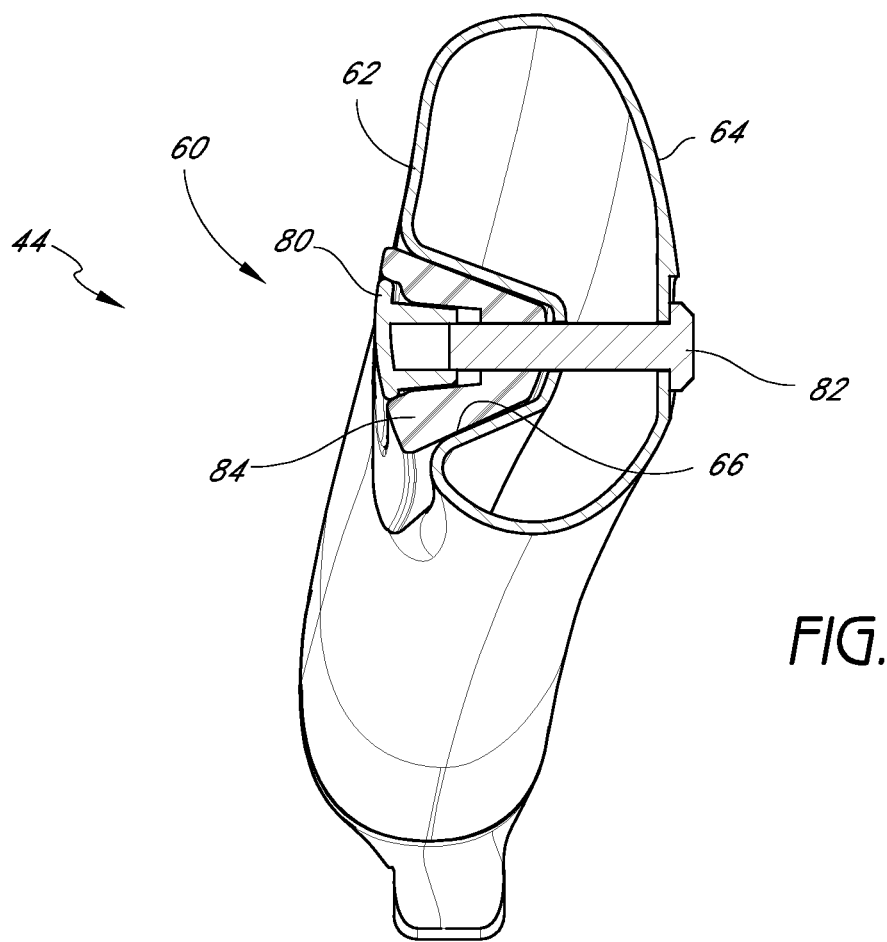
FIG. 4 is a cross-section view of the right leg portion of the front fork assembly of FIG. 1 taken along line 4-4 of FIG. 3.
Figure 5:
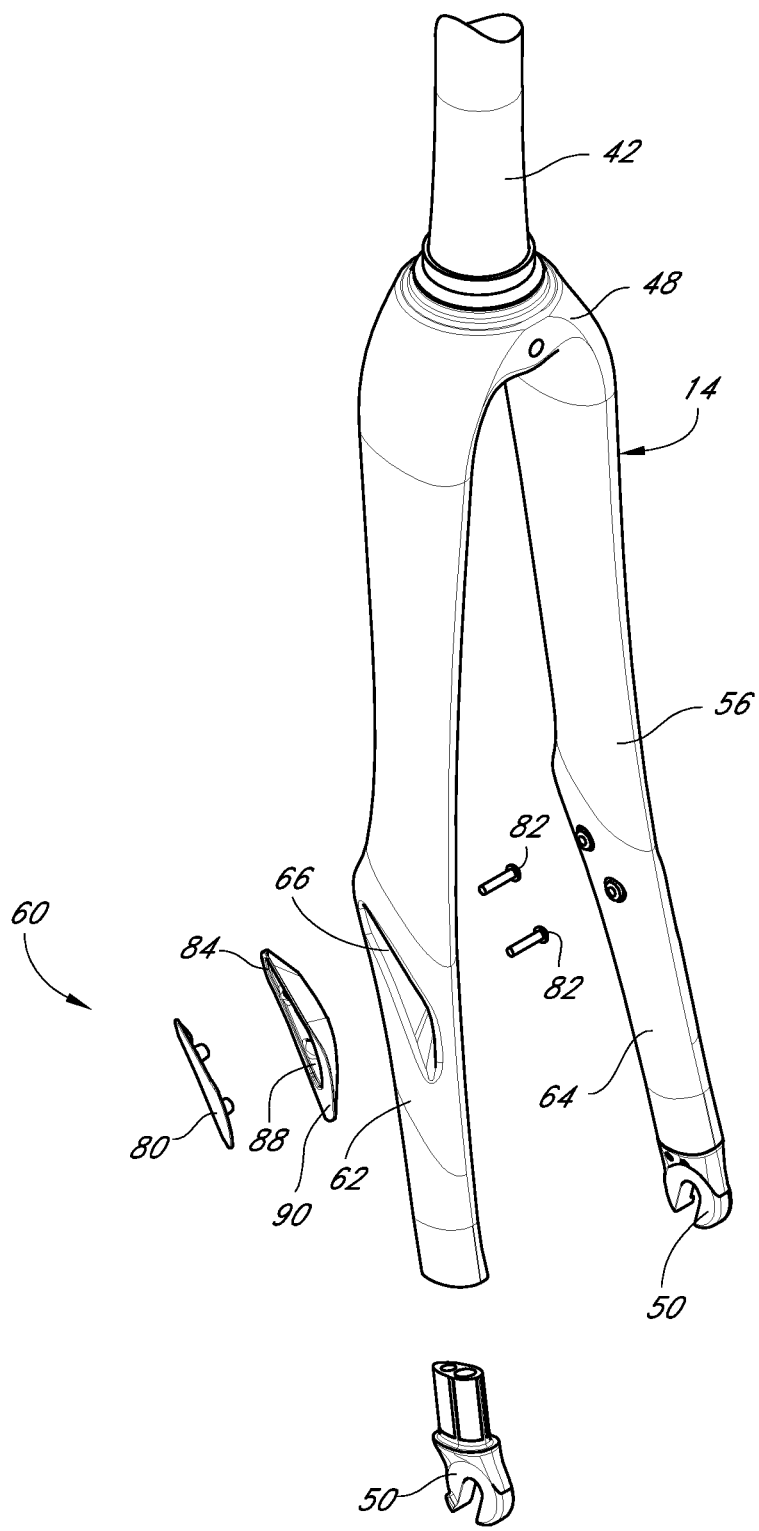
FIG. 5 is a perspective view of a portion of a partially disassembled front fork assembly.

Looking to FIGS. 4-5, one embodiment of a damping system 60 has a damping member 84 on an outside surface 62 of a fork leg. As shown, the damping member 84 is placed into a surface cavity 66 in the fork leg. Two threaded fasteners 82 engage a plate 80 which secures the damping member 84 in place and thereby forces the damping member 84 into contact with the surface of the fork leg. As shown, the damping member 84 is sandwiched between the fork leg and the plate 80. Bolt tension can compress the damping member 84 into contact with the surface of the fork leg allowing the damping member to influence the vibrations being transmitted through the fork leg. This forced contact with the surface of the fork leg helps to ensure a resulting damping effect. As mentioned previously, the damping member 84 can be an elastomeric material.

In other embodiments, fasteners can be used to connect directly to the damping member. For example, a fastener can connect to a damping member in a similar manner as shown in FIG. 4 but without the plate. The damping member can be a solid piece that accepts the fastener into the damping member or the fastener may pass through the damping member.

The damping member can also be formed with one or more projections. The projections can be configured to hold the damping member in place. In some embodiments, the projections can have a head, flange, or other contact surface on an end opposite the damping member. The head can be used to maintain the damping member in place, similar to a head on a fastener. In this way, the projections can be used in place of or in addition to one or more fasteners. The projection with a head or contact surface can also be used to force the damping member into contact with the fork leg or other component and result in a damping effect.

Referring again to FIG. 4, in some embodiments, a damping member with a projection can be formed in the same shape as the combined plate, damping member and fastener shown. A damping member with a projection can be received into a cavity on a surface of a fork leg. The projection can pass through the fork leg to the side of the fork leg opposite the cavity. In such a configuration, the projection can be in tension between a head or contact surface on one side of the fork leg and the body of the damping member within the cavity on the other side. In this way, the body of the damping member can be forced into contact with the fork leg to provide a damping effect.

Preferably, the damping system 60 is located within the intermediate portion 56 of each fork leg 44, 46. The damping member 84 can be elongated and/or contoured or otherwise shaped so as to advantageously maximize the contact area between the damping member 84 and the fork leg 44, 46 within the space available, which enhances vibration damping, while preserving the strength and stiffness of the fork 14, which improves handling.

Furthermore, desirably the damping member 84 is substantially solid and, preferably, is completely solid. Such an arrangement advantageously provides consistent, uniform vibration damping performance of the damping system 60. In addition, desirably, the cross-sectional area of the damping member 84 is great enough to effectively dampen vibrations from reaching the rider of the bicycle 10.

With reference to FIG. 4, the right fork leg 44 is shown in a cross-sectional view taken along a horizontal plane and intersecting the damping system 60. As used herein, a vertical, longitudinal plane extends along the length of the bicycle 10 and is substantially aligned with a plane defined by the frame 12 and wheels 16, 20. A vertical, lateral plane is substantially normal to the longitudinal plane and a horizontal plane is substantially normal to both the longitudinal and lateral planes.

The cross-section of the damping member 84 can have any of a variety of shapes. For example, the damping member 84 can be wedge shaped or trapezoidal. The shape of the cross-section can allow for increased contact with the surface cavity 66 and can increase the effectiveness of the bolt tension and the sandwiching effect to press the damping member 84 into contact with the fork leg and reduce transmitted vibrations. In some embodiments, the damping member 84 can further include a cavity 88 and rim 90. The plate 80 can be inserted into the cavity 88. The cavity 88 can be sized so as to be slightly smaller then the plate 80. This can cause the plate to force the rim 90 to move outwardly and further into contact with the sides of the cavity 66.

As illustrated, desirably, the fork leg 44 is of a thin wall, hollow construction to reduce weight. The fork leg 44 has an outside surface 62, and an inside surface 64, where the inside surface is the surface closest to the wheel 16. Either both, or only one of the inside and outside surfaces can define a cavity 66, for receiving a damping member 84. The fastener 82 can be advanced through the inside surface towards the outside surface to attached to a plate 80. This can allow the fastener or the head of the fastener to be on the inside near the wheel 16 and therefore not readily apparent. The plate 80 can also be used as a badge for branding or stylistic purposes.

Although not shown in detail, desirably, the left fork leg 46 can be substantially a mirror image of the left fork leg 44. However, as will be readily appreciated by one of skill in the art, in other aspects the damping system 60 of the left fork leg 46 can be substantially identical to that described above.

Figure 6:
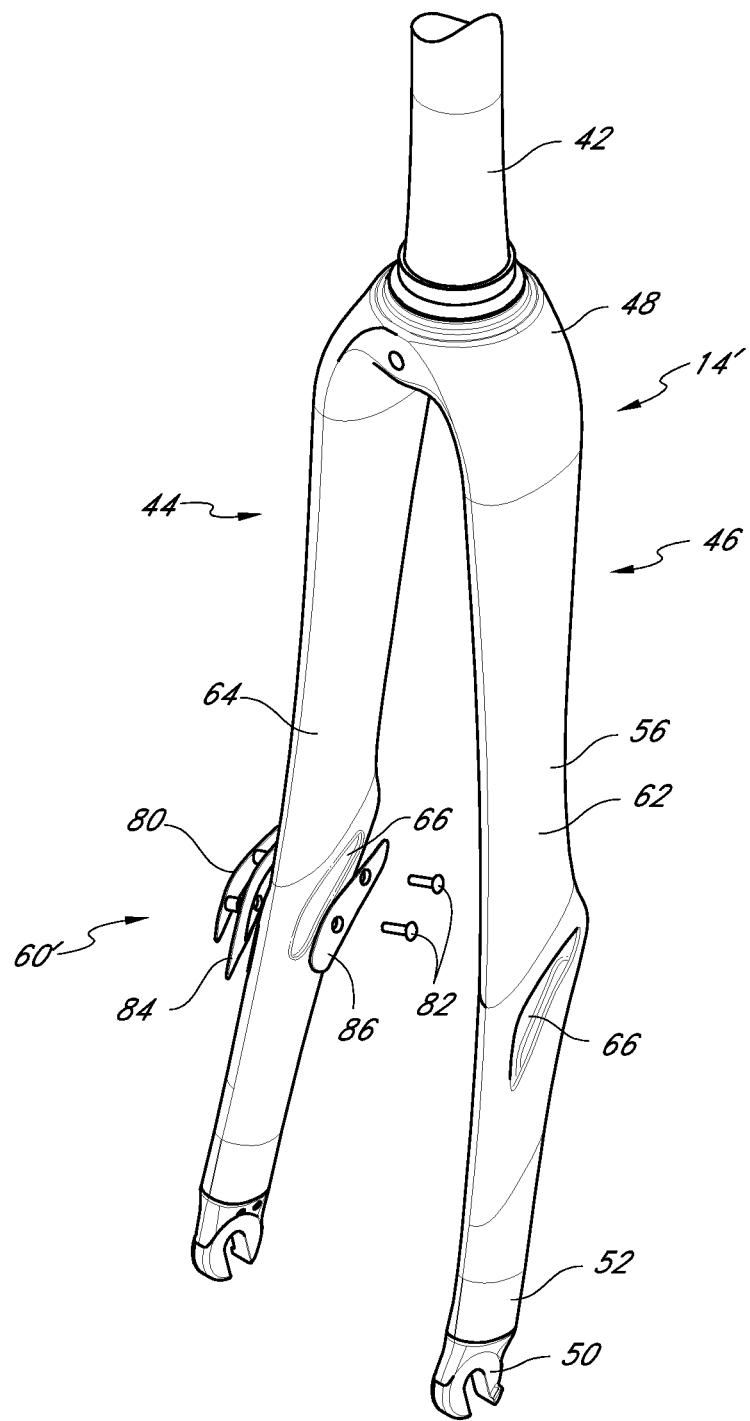
FIG. 6 is a perspective view of another embodiment of a portion of a partially disassembled front fork assembly.
Figure 7:
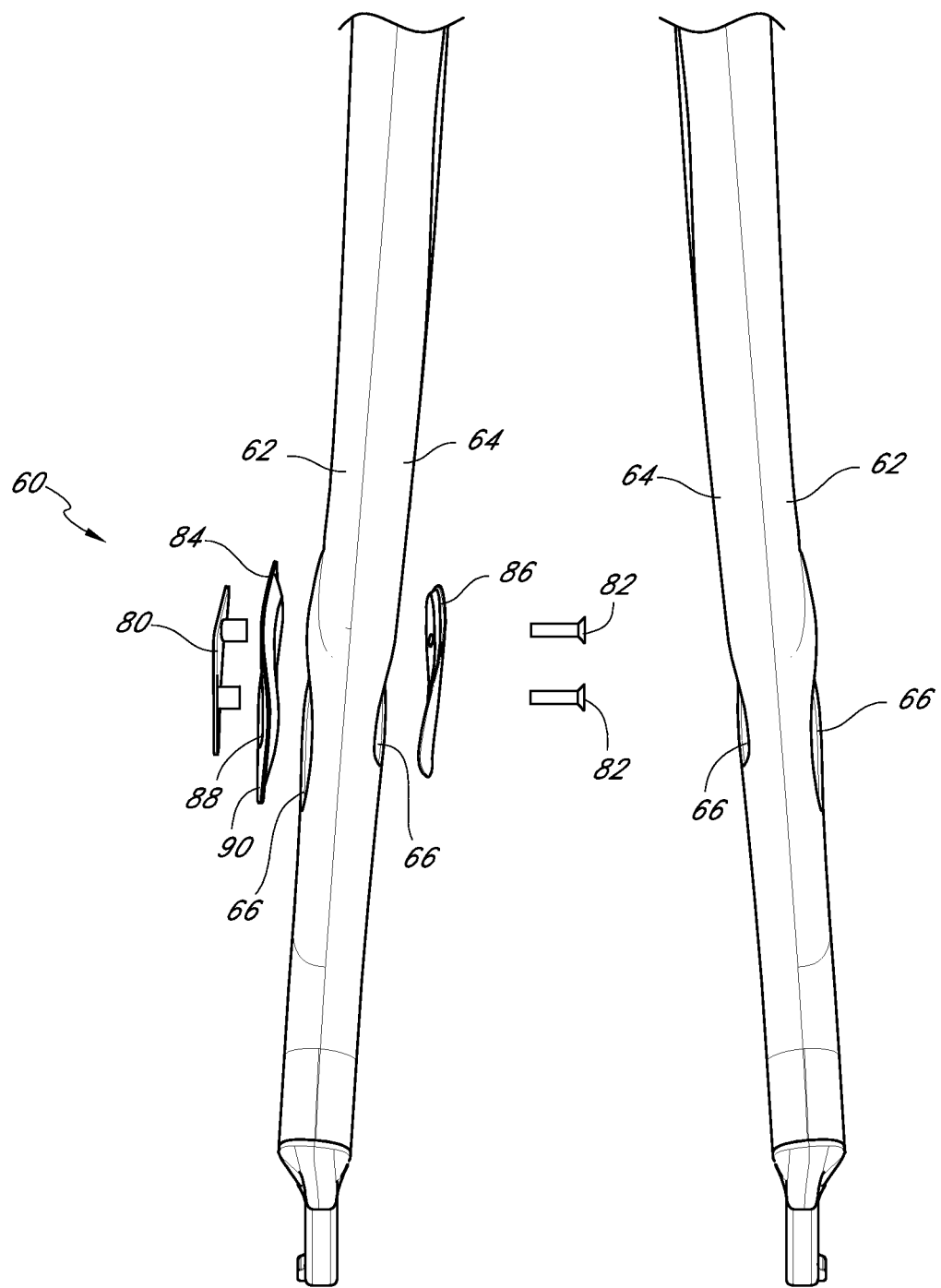
FIG. 7 is a front view of a portion of the partially disassembled front fork assembly of FIG. 6.

Turning now to FIGS. 6-7, another embodiment of a damping system 60' on a fork 14' is shown. The damping system 60' has a first damping member 84 on an outside surface 62 of a fork leg and a second damping member 86 on an inside surface 64 of the fork leg. As shown, the damping members 84, 86 are placed into surface cavities 66 in the fork leg. Two threaded fasteners 82 engage a plate 80 which secures the damping members 84, 86 in place and thereby forces the first and second damping members into contact with the surface of the fork leg. As shown, the damping members 84, 86 are sandwiched between the fork leg and either the plate 80 or the fasteners 82. This forced contact with the surface of the fork leg helps to ensure a resulting damping effect. As mentioned previously, the damping members 84, 86 can be an elastomeric material.

In other embodiments, the two damping members 84, 86 can be directly connected together. In some embodiments one or more fasteners can be connected directly to one or both of the damping members. Alternatively, one or two of the damping members can be formed with one or more projections. The projections can function in a way similar to a fastener. In some embodiments, the projections can have a head, flange, or other contact surface on an end opposite the damping member. The projection with a head or other contact surface can be used to force the damping member into contact with the fork leg or other component and result in a damping effect. Projections can also be used to connect the damping members 84, 86.

When constructed substantially as described in any of the embodiments above, the fork assembly inhibits or reduces vibrations from passing through the fork legs 44, 46. Thus, vibrations originating at the lower end 52 of the fork legs 44, 46 (i.e., at the front wheel 16) are inhibited, or reduced in magnitude, from passing to the upper ends 48 and steer tube 42 of the fork and, thus, the handlebar 18 of the bicycle 10. Such an arrangement improves the comfort of the rider and reduces fatigue during long rides.

Preferably, the entire fork assembly, with the exception of the damping system, is constructed in a manner conventional for composite bicycle forks. However, the fork assembly may be constructed by any other suitable method. Advantageously, the fork assembly can be lighter weight than prior fork assemblies that used damping systems with an insert, such as where a cavity passed all the way through the fork. This is because of the reduction in the amount of material necessary for creating surface cavities as opposed to cavities that pass completely through the fork leg. Also, for carbon fiber, the improved design allows for better lay-up control by the elimination of the need for two bladders and two carbon tubes to create the cavities. Thus, one bladder can be used and in some embodiments the one bladder can be used to create the space above, below, behind, and to the sides of the surface cavity. Similar benefits are also experienced in use with the damper system 60 in other areas of the bicycle, such as the seat stays, seat tube, and chain stays.

Figure 8:
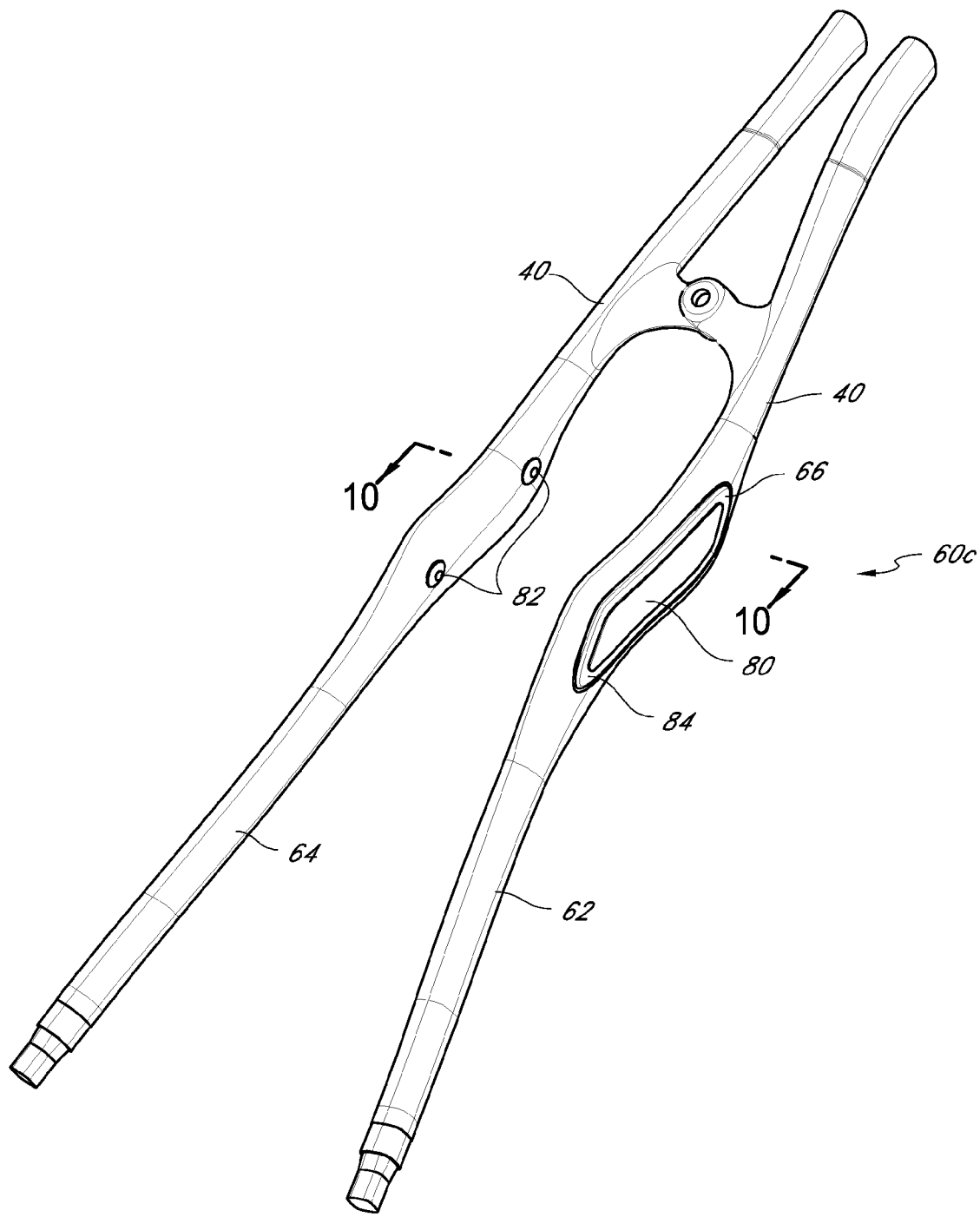
FIG. 8 is a perspective view of a portion of a rear frame portion.
Figure 9:
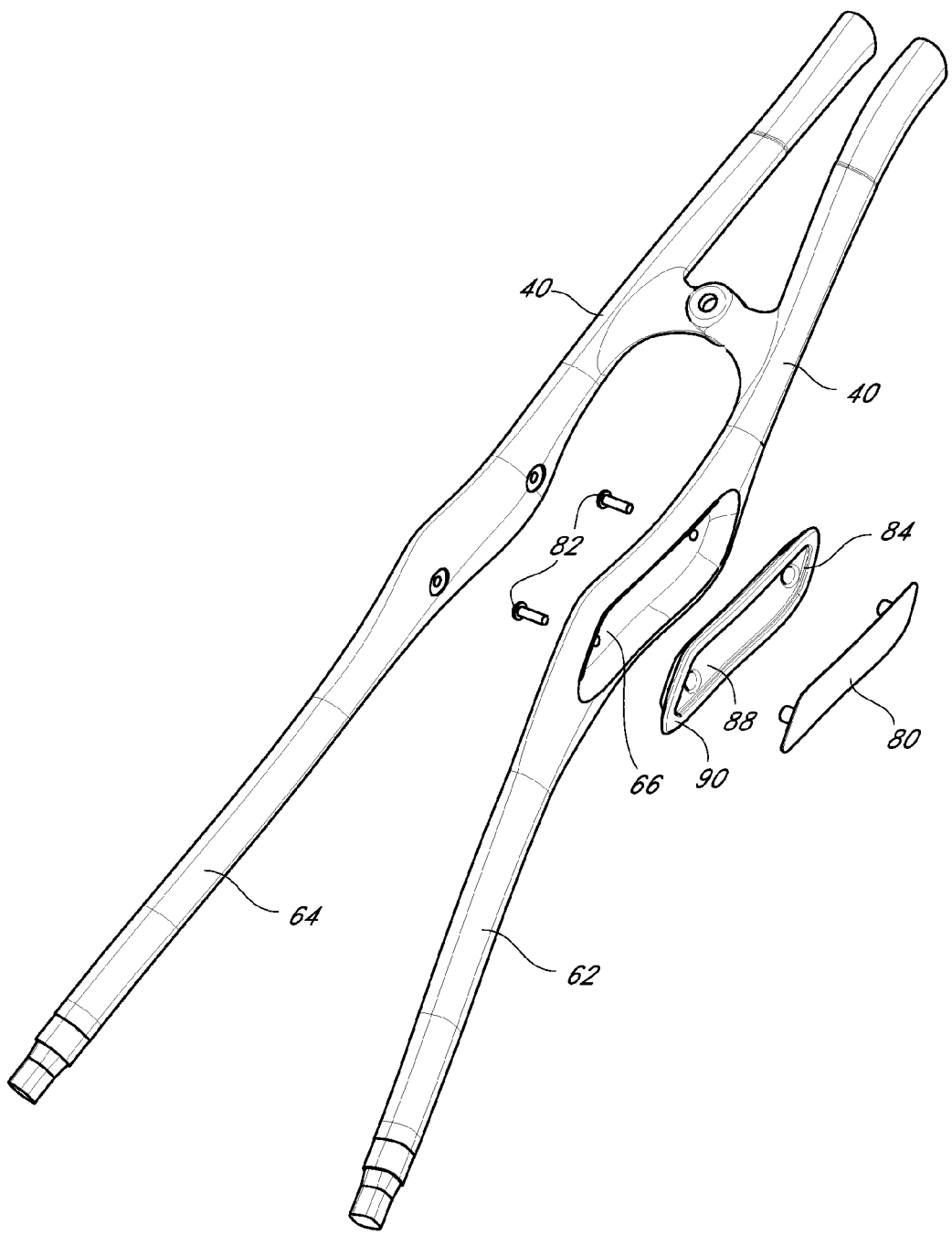
FIG. 9 is a perspective partially disassembled view of the portion of the rear frame portion of FIG. 8.
Figure 10:
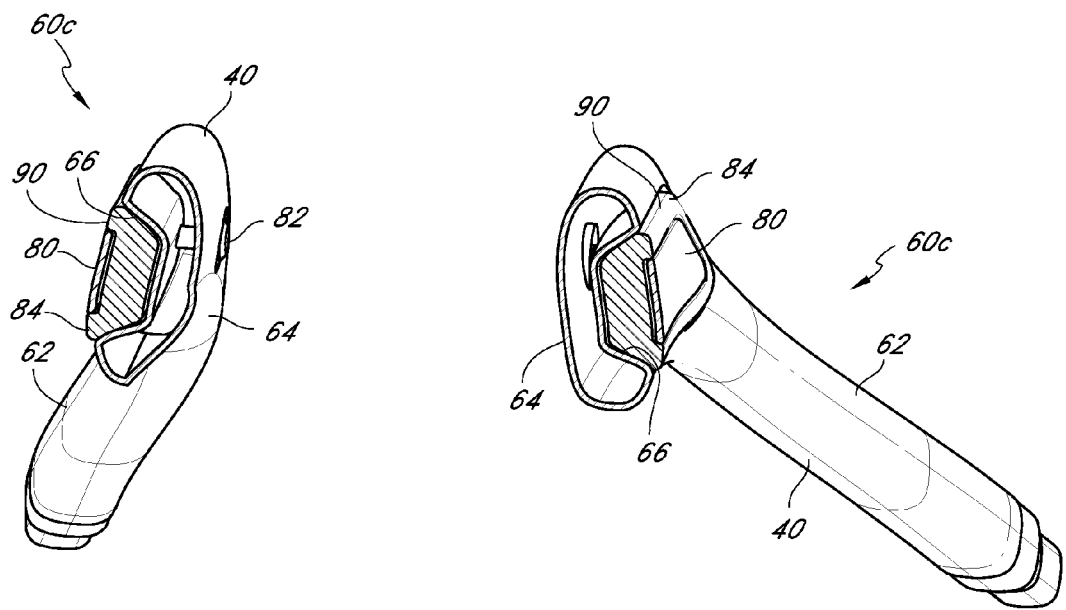
FIG. 10 is a cross-section view of the portion of a rear frame portion of FIG. 8 taken along line 10-10.

Turning now to FIGS. 8-10, an embodiment of a damping system 60c is shown, in use with the seat stays 40 of a rear frame portion 36. As shown, the damping member 84 is placed into a surface cavity 66 in the seat stay 40. Two threaded fasteners 82 engage a plate 80 which secures the damping member 84 in place and thereby forces the damping member 84 into contact with the surface of the seat stay 40. Thus, the damping member 84 is sandwiched between the seat stay 40 and the plate 80. The bolt tension can compress the damping member 84 into contact with the surface of the seat stay 40 allowing the damping member to influence the vibrations being transmitted through the seat stay 40. This forced contact with the surface of the seat stay 40 helps to ensure a resulting damping effect.

Preferably, the damping system 60 is located within the intermediate portion of each seat stay 40. The damping member 84 can be elongated and/or contoured or otherwise shaped so as to advantageously maximize the contact area between the damping member 84 and the seat stay 40 within the space available, which enhances vibration damping, while preserving the strength and stiffness of the seat stay 40. For example, as shown in FIG. 10, the damping member 84 can have a trapezoidal cross-section. This can allow for increased contact with the surface of the seat stay 40 and can increase the effectiveness of the bolt tension and the sandwiching effect to press the damping member 84 into contact with the seat stay surface and reduce transmitted vibrations.

In some embodiments, the damping member 84 can further include a cavity 88 and rim 90. The plate 80 can be inserted into the cavity 88. The cavity 88 can be sized so as to be slightly smaller then the plate 80. This can cause the plate to force the rim 90 to move outwardly and further into contact with the sides of the cavity 66 in the seat stay 40.

Similar to the fork leg, the seat stay 40 can be of a thin wall, hollow construction to reduce weight. The seat stay 40 can also have an outside surface 62, and an inside surface 64, where the inside surface is the surface closest to the wheel 20. Either both, or only one of the inside and outside surfaces can define a cavity 66, for receiving a damping member 84. The fastener 82 can be advanced through the inside surface towards the outside surface to attach to a plate 80. This can allow the fastener or the head of the fastener to be on the inside near the wheel 20 and therefore not readily apparent. The plate 80 can also be used as a badge for branding or stylistic purposes.

In other embodiments, fasteners can be used to connect directly to the damping member. Alternatively, the damping member can be formed with one or more projections, such as projections with a head, flange, or other contact surface. The projection with a head or other contact surface can be used to compress the damping member into contact with the seat stay or other component and result in a damping effect. Thus, the projections can function in the same or a similar way as a fastener.

When constructed substantially as described in any of the embodiments above, the rear frame portion with damping system inhibits vibrations from passing through the seat stays 40. Thus, vibrations originating at the lower end of the seat stays (i.e., at the back wheel 20) are inhibited from passing to the upper ends and to the main frame 34. Such an arrangement improves the comfort of the rider and reduces fatigue during long rides.

Of course, the foregoing description is that of certain features, aspects and advantages of the present invention to which various changes and modifications may be made without departing from the spirit and scope of the present invention. Moreover, a damping system may not feature all objects and advantages discussed above in order to use certain features, aspects and advantages of the present invention. Thus, for example, those skilled in the art will recognize that the invention may be embodied or carried out in a manner that achieves or optimizes one advantage or a group of advantages as taught herein without necessarily achieving other objects or advantages as may be taught or suggested herein. The present invention, therefore, should only be defined by the appended claims.

What is claimed is:

1. A bicycle, comprising:
  a main frame portion;
  a wheel;
  a substantially rigid wheel support coupled to said main frame portion at a first end and supporting said wheel at a second end, an outer wall of said wheel support defining a first surface cavity, wherein said wheel is a front wheel of said bicycle and said wheel support is a front fork;
  a damping member positioned within said first surface cavity;
  a fastener;
  a plate, wherein said plate and fastener secure said damping member within said first surface cavity and force said damping member into contact with a surface of said first surface cavity to thereby dampen vibrations introduced to said wheel support by said wheel; and
  a second surface cavity and a second damping member positioned within said second surface cavity, wherein the fork comprises two fork legs, and the first and second surface cavities are on opposing sides of one fork leg;
  wherein said plate is connected to said fastener such that the first damping member is sandwiched between the plate and the fork leg and the second damping member is sandwiched between a head of the fastener and the fork leg.

2. The bicycle of claim 1, wherein said first damping member is a solid piece of elastomeric material.

3. The bicycle of claim 2, wherein said first damping member occupies substantially the entire volume of the first surface cavity.

4. The bicycle of claim 1, wherein said cavity is located in an intermediate portion of said wheel support between said first and second ends.

5. A bicycle, comprising:
  a main frame portion;
  a wheel;
  a substantially rigid wheel support coupled to said main frame portion at a first end and supporting said wheel at a second end, an outer wall of said wheel support defining a first surface cavity, wherein said wheel is a front wheel of said bicycle and said wheel support is a front fork;
  a damping member positioned within said first surface cavity;
  a fastener to secure said damping member within said first surface cavity, wherein said damping member is configured to be forced into contact with a surface of said first surface cavity to thereby dampen vibrations introduced to said wheel support by said wheel;
  a second surface cavity and a second damping member positioned within said second surface cavity, wherein the fork comprises two fork legs, and the first and second surface cavities are on opposing sides of one fork leg; and
  a plate, wherein said plate is connected to said fastener such that the first damping member is sandwiched between the plate and the fork leg and the second damping member is sandwiched between a head of the fastener and the fork leg.

6. The bicycle of claim 5, wherein said first damping member is a solid piece of elastomeric material which occupies substantially the entire volume of the first surface cavity.

7. The bicycle of claim 5, wherein said cavity is located in an intermediate portion of said wheel support between said first and second ends.

8. A bicycle, comprising:
  a main frame portion;
  a front wheel;
  a front fork coupled to the main frame portion and supporting said wheel, the front fork comprising a fork leg and an outer wall of the fork leg defining first and second surface cavities on opposite sides of the fork leg;
  a first damping member positioned within the first surface cavity;
  a second damping member positioned within the second surface cavity;
  a fastener; and
  a plate, wherein the plate is connected to the fastener such that the first damping member is sandwiched between the plate and the fork leg and the second damping member is sandwiched between a head of the fastener and the fork leg.

9. The bicycle of claim 8, wherein said first damping member is a solid piece of elastomeric material.

10. The bicycle of claim 9, wherein said first damping member occupies substantially the entire volume of the first surface cavity.

11. The bicycle of claim 8, wherein said cavity is located in an intermediate portion of said front fork between first and second ends.

12. The bicycle of claim 8, wherein the front fork further comprises a second fork leg.

* * * * *